United States Patent [19]

Ohi

[11] Patent Number: 4,922,171
[45] Date of Patent: May 1, 1990

[54] MOTOR ACTUATOR WITH AIR-MIX DOOR OPENING-LIMITER AND BUILT-IN SWITCHING UNIT

[75] Inventor: Shinichi Ohi, Konan, Japan

[73] Assignee: Diesel Kiki Co., Ltd., Tokyo, Japan

[21] Appl. No.: 406,969

[22] Filed: Sep. 13, 1989

[30] Foreign Application Priority Data

Sep. 17, 1988 [JP] Japan .................. 63-121838
Oct. 14, 1988 [JP] Japan .................. 63-134292

[51] Int. Cl.$^5$ ............................................. B60H 1/00
[52] U.S. Cl. ................................... 318/471; 318/468; 165/28; 165/43
[58] Field of Search ............. 318/466, 467, 468, 471, 318/472, 473, 641; 98/2, 2.01, 2.06, 2.11; 123/41.04, 41.06; 165/28, 30, 41, 42, 43; 237/12.1, 12.3 R

[56] References Cited

U.S. PATENT DOCUMENTS

| | | | |
|---|---|---|---|
| 3,826,963 | 7/1974 | Lorenz | 318/471 |
| 4,381,480 | 4/1983 | Hara et al. | 318/471 |
| 4,476,919 | 10/1984 | Akimoto et al. | 165/28 |
| 4,685,508 | 8/1987 | Iida | 165/28 X |
| 4,829,884 | 5/1989 | Kagohata | 98/2.01 |
| 4,834,283 | 5/1989 | Akabane et al. | 318/468 X |

Primary Examiner—Bentsu Ro
Attorney, Agent, or Firm—Wenderoth, Lind & Ponack

[57] ABSTRACT

A motor actuator for use in an automobile air-conditioner for actuating air-mix door, includes an electric circuit for controlling the rotational speed of a motor depending on various conditions such, for example, as a vehicle compartment temperature, and a mechanical limit switch for limiting or restricting the extent of angular movement of the air-mix door, or an electric circuit for the limitation of the angular movement of the air-mix door. According to a preferred embodiment, a built-in switching unit having a mechanical switch disposed in a first housing for producing control signals for various components for the air-conditioner, and a motor actuator having a motor and an electric circuit disposed in a second housing are detachably assembled together by a locking lug and a mating retainer recess.

5 Claims, 7 Drawing Sheets

MOTOR ACTUATOR WITH AIR-MIX DOOR OPENING-LIMITER AND BUILT-IN SWITCHING UNIT

BACKGROUND OF THE INVENTION

1. Field of the Invention

The present invention relates to a motor actuator incorporated, for example, in automobile air-conditioner for actuating an air-mix door of the air-conditioner.

2. Description of the Prior Art

A typical example of motor actuators of the type concerned is disclosed, for example, in Japanese Patent Laid-open Publication No. 58-209609. The disclosed motor actuator is used for actuating an air-mix door and includes a mechanical switch for producing control signals used for mode selection and fan controlling. The changeover signal issued from the mechanical switch is employed in an external control circuit.

When controlled with the known motor actuator, the air-mix door is actuated to turn or angularly move between a full-cool position and a full-heat position.

Such a mere setting of the air-mix door in two extreme positions does not guarantee a comfortable air-conditioning feeling when the air-conditioner is operating in a certain discharge mode.

For instance, when the air-mix door is set in the full-heat position while air-conditioner is operating in the vent mode, high temperature air is directed to the face of an occupant, thus deteriorating the air-conditioning feeling.

Another drawback associated with the prior art motor actuator is that the switch mechanism disposed in the motor actuator for producing control signals for various components of the air-conditioner is mutually wasteful when mode selection of the actuator motor is controlled by a computer. With this wasteful switch mechanism, the cost of the prior art motor actuator is considerably high.

SUMMARY OF THE INVENTION

It is accordingly an object of the present invention to provide a motor actuator which is simple in construction and having a mechanism for limiting or restricting the opening of an air-mix door.

Another object of the present invention is to provide a motor actuator having a switching unit which is capable of producing control signals for various air-conditioning components except the air-mix door and is detachable from the motor actuator when needed.

A further object of the present invention is to provide a motor actuator having a switching unit which is capable operating stably and reliably by incorporating therein a circuit portion which would otherwise tend to cause an operation failure under the influence of noise produced when the motor actuator is activated.

According to a first aspect of the present invention, there is provided a motor actuator for an air-mix door of an automobile air conditioner, comprising: (a) a motor for driving the air-mix door; (b) a driver circuit for the motor, the driver circuit being operative to energize the motor based on the combination of two input signals and also to de-energize the motor when the two input signals are identical to one another; (c) a stop switch for supply a stop signal to the driver circuit for causing the driver circuit to stop energizing the motor, the stop switch including (c-i) a movable contact adapted to be turned through a predetermined angular distance simultaneously with operation of the motor, (c-ii) a first fixed electrode disposed at one end of the predetermined angular distance and engageable with the movable contact, and (c-iii) a second fixed electrode disposed at the other end of the predetermined angular distance and engageable with the movable contact; and (d) a limit switch for limiting angular movement of the movable contact toward one of the first and second fixed electrodes as the movable contact is moved by the motor, the limit switch including (d-i) the movable contact and (d-ii) a third fixed electrode, the third fixed electrode being disposed on a first arc extending in an arcuate path of movement of the movable contact, the first arc being different from a second arc on which the first and second fixed electrodes are disposed, the third fixed electrode being connected with said one of the first and second fixed electrodes via a vent switch adapted to be closed when the air-conditioner is operating in a vent mode, (d-iii) the limit switch, when the movable contact engages the third fixed electrode, being operative to cause the combination of the input signals of the driver circuit to be set in a condition to stop energizing of the motor.

With this construction, when the movable contact engages the third fixed electrodes during the vent mode operation, one of the first and second electrodes is brought into contact with the movable contact through the vent switch and the third fixed electrode. Such connecting condition is the same as the condition obtained when the stop switch is turned on. Two input signals in the drive circuit are therefore the same, so that the angular movement of the actuator motor toward the first fixed electrode or the second fixed electrode is stopped before the movable contact reaches the first fixed electrode or the second fixed electrode.

According to a second aspect of the present invention, there is provided a motor actuator for an air-mix door of an automobile air-conditioner, comprising: (a) a motor for driving the air-mix door; (b) a driver circuit for the motor, the driver circuit being operative to energize the motor based on the combination of two input signals and also to de-energize the motor when the two input signals are identical to one another; (c) a stop switch for supply a stop signal to the driver circuit for causing the driver circuit to stop energizing the motor, the stop switch including (c-i) a movable contact adapted to be turned through a predetermined angular distance simultaneously with operation of the motor, (c-ii) a first fixed electrode disposed at one end of the predetermined angular distance and engageable with the movable contact, and (c-iii) a second fixed electrode disposed at the other end of the predetermined angular distance and engageable with the movable contact; (d) a position sensor for detecting the position of the movable contact; and (e) a comparator circuit for detecting a predetermined output signal from the position sensor while the air-conditioner is operating in a vent mode and equalizing the potential of one of the first and second fixed electrodes and the potential of the other fixed electrode to thereby limiting rotation of the motor toward the other fixed electrode.

With this construction, the angular position or opening of the air-mix door can be limited or restricted by a simple construction of the position sensor and the comparator circuit.

According to a third aspect of the present invention, there is provided a combined motor-actuator and switching-unit assembly for an air-mix door for an automobile air-conditioner, comprising: (a) a motor actuator including (a-i) a first housing, (a-ii) a motor disposed in the first housing for driving the air-mix door, and (a-iii) an electric circuit disposed in the first housing for controlling operation of the motor based on at least a vehicle compartment temperature and a setting temperature; (b) a switching unit including (b-i) a second housing, and (b-ii) a switch mechanism disposed in the second housing for producing control signals for controlling various components of the automobile air-conditioner except the air-mix door, the switch mechanism including a rotating member interconnected with an output shaft of the motor actuator for co-rotation therewith, a movable contact disposed on the rotating member, and a plurality of fixed electrodes engageable with the movable contact; (c) at least one locking lug disposed on one of the first and second housings, and at least one retaining recess provided in the other housing and locking receptive of the locking lug; and (d) means defining an engagement hole in one of the output shaft and the rotating member for receiving the other of the output shaft and the rotating member, whereby the first and second housings are assembled together through interlocking engagement between the locking lug and the retainer recess, and the rotating member is movable together with the output shaft of the motor actuator.

With this construction, the motor actuator and the switching unit can be assembled together reliably with utmost ease through interlocking engagement between the locking lugs and the mating retainer recesses.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

The present invention will be described herein below in greater detail with reference to certain preferred embodiments shown in the accompanying drawings.

Figure 1:
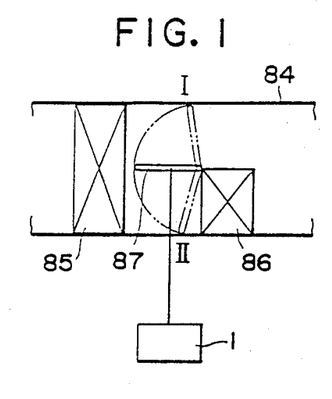
FIG. 1 is a diagrammatical view of a portion of an automobile air-conditioner having an air-mix door controlled by a motor actuator according to the present invention.

FIG. 1 diagrammatically shows a motor actuator 1 embodying the present invention for controlling an air-mix door of an automobile air-conditioner. The automobile air-conditioner includes an airflow duct 84 in which an evaporator 85 connected with a refrigeration cycle or system (not shown), a heater core 86 connected with an engine cooling water circulation circuit (not shown) are disposed in the order named as viewed from the upstream end of the duct 84. Disposed in front of the heater core 86 is an air-mix door 87 angularly movable to change its opening for regulating the ratio of air passing through the heater core 86 and air bypassing the heater core 86.

A first embodiment of the present invention is described below with reference to FIGS. 2 through 5.

Figure 2:
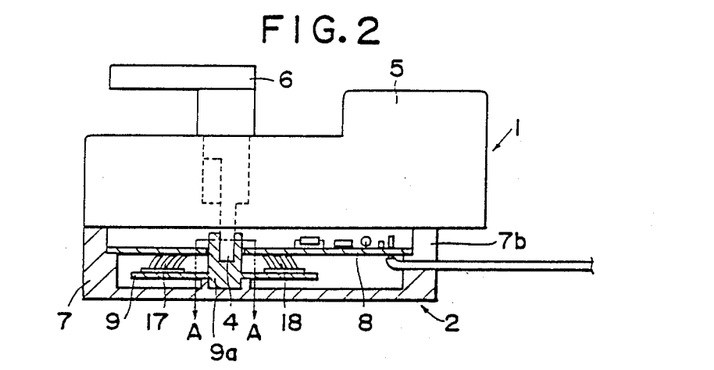
FIG. 2 is a front elevational view, partly in cross section, of the motor actuator incorporating a switching unit.

As shown in FIG. 2, the motor actuator 1 includes a built-in switching unit 2 at its bottom portion.

This motor actuator 1 is structurally similar to the motor actuator disclosed in Japanese Utility Model Laid-open Publication No. 62-159154 but differs therefrom in that a circuit for controlling the angular position of the air-mix door 87 and an electronic circuit for producing control signals for controlling an actuator motor 3 are incorporated.

Figure 5A:
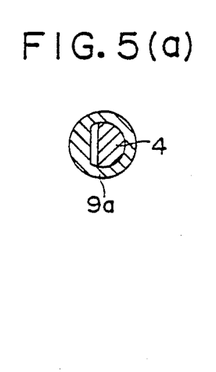
FIGS. 5(a) and 5(b) are cross-sectional views taken along line A—A of FIG. 1, showing two different operating conditions.
Figure 5B:
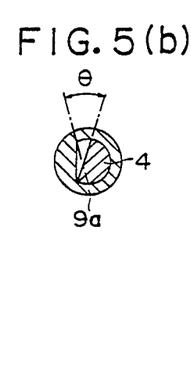

The motor actuator 1 includes an output shaft 4 projecting outwardly from an upper housing 5 of the motor actuator 1 and secured by press-fitting to a lever 6 at its upper end. The lower end of the output shaft 4 projects downwardly from the bottom of the upper housing 5. A lower end portion of the output shaft 4 which projects from the bottom of the upper housing 5 has a generally D-shaped cross-sectional shape, as shown in FIGS. 5(a) and 5(b). Such D-shaped cross-sectional shape is obtained by cotting out or removing a segmental portion from a circular cylindrical body of the output shaft 4 along a plane extending parallel to a longitudinal axis of the output shaft 4. The D-shaped lower end portion of output shaft 4 is fitted in an engagement hole 19 in a contact mount base 9 of the switching unit 2.

The switching unit 2 includes a switch mechanism used for controlling the operation of various components of the air-conditioner except the air-mix door 87. According to the illustrated embodiment, the switching unit 2 includes a switch mechanism for controlling a fan motor 48, and a switch mechanism for producing control signal for controlling the discharge mode of the air-conditioner. The mechanical structure and the electrical function of the switching unit 2 is described later on.

The switching unit 2 includes a lower housing 7 of a generally rectangular box shape, a circuit board 8 and the contact mount base 9 both disposed in the housing 7. The housing 7 has a boss 10 projecting from the bottom 7a thereof, and a step 11 (FIG. 3) formed on an inner surface of a peripheral side wall of the housing 7. The step 11 has formed therein four threaded holes 11a (FIG. 3) disposed at respective corners of the rectangular housing 7. The boss 10 receives one end of a rotary shaft 9a of the contact mount base 9. The step 11 carries thereon a peripheral portion of the circuit board 8. The circuit board 8 is secured to the housing 7 by means of screws 12 (FIGS. 3 and 4) threaded to the respective threaded holes 11a. In this assembled condition, the other end of the rotary shaft 9a of the contact mount base 9 projects upwardly through a through-hole 8a in the circuit board 8.

Figure 3:
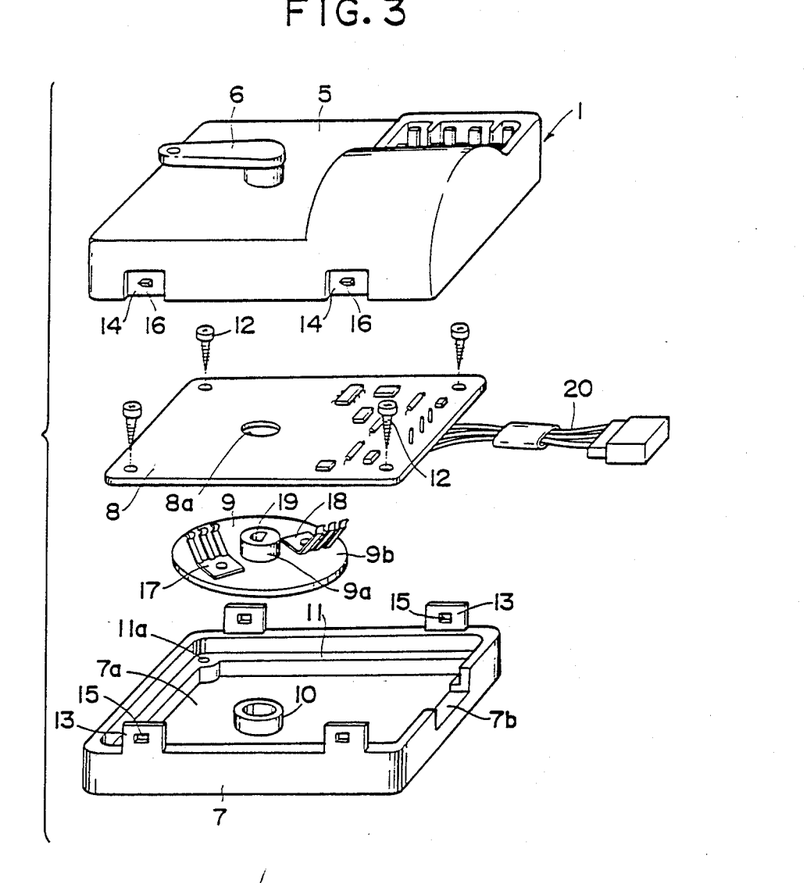
FIG. 3 is an exploded perspective view of the motor actuator shown in FIG. 2.
Figure 4:
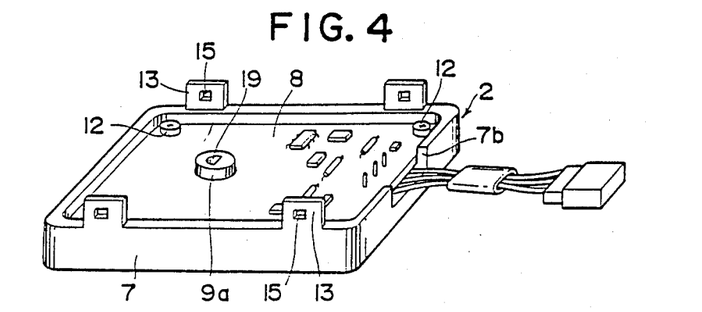
FIG. 4 is a perspective view of a portion of the motor actuator, showing the switching unit.

As shown in FIG. 3, the housing 7 of the switching unit 2 further includes four attachment lugs 13 disposed adjacent to the respective corners of the housing 7 and projecting an upper end of the side wall. The attachment lugs 13 are received respectively in retainer recesses 14 in the housing 5 of the motor actuator 1. The attachment lugs 13 have locking holes 15 adapted to be snap-fitted with locking projections 16 on the respective recesses 14 to join the upper and lower housings 5, 7.

The contact mount base 9 is composed of a circular disk 9b of a electrically non-conductive material and has a central rotary shaft 9a formed integrally with the disk 9b. The rotary shaft 9a may be formed separately from the disk 8b but they are joined together for co-rotation. The disk 9b carries on its upper surface a pair of movable contacts 17, 18 disposed symmetrically with respect to the center of the disk 9b. The rotary shaft 9a has an axial engagement hole 19 extending from one or an upper end of the rotary shaft 9a so that the engagement hole 19 is disposed on the same side of the movable contacts 17, 18. The engagement hole 19 receives the D-shaped lower end portion of the output shaft 4. To this end, the engagement hole 19 has a generally D-shaped cross-sectional shape which is obtained by filling a segmental portion of a circular cylindrical body with the material of the rotary shaft 9a. However, the segmental portion of the engagement hole 19 is somewhat smaller than the segmental portion of the output shaft 4 so that the D-shape of the engagement hole 19 is somewhat larger than the D-shape of the output shaft 4, as shown in FIG. 5(a). Accordingly, the play or backlash occurs between the output shaft 4 and the rotary shaft 9a when the output shaft 4 turns, the amount of backlashing being equal to an angle $\theta$, as shown in FIG. 5(b). With this backlash, the electric circuit produces a hysteresis characteristic described later on.

Figure 6:
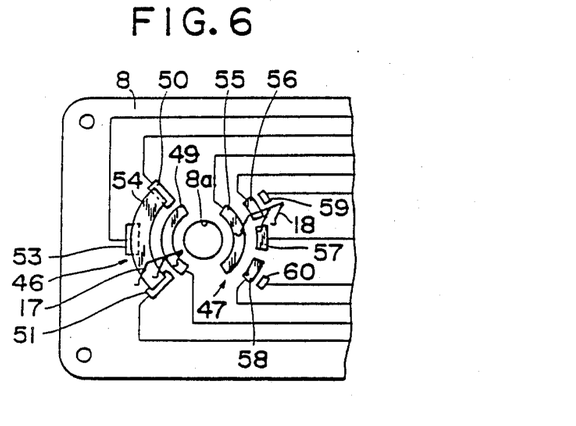
FIG. 6 is a fragmentary plan view showing patterns of a speed regulation variable resistor and a mode selection switch provided on a circuit board of the switching unit.

The circuit board 8 has, on its one surface facing the movable contacts 17, 18, a conductive pattern such as shown in FIG. 6. The opposite surface of the circuit board 8 carries various electronic parts such as ICs.

The circuit board 8 is connected at its one side to a connector cable 20 (FIG. 3). The connector cable 20 is led out from the housing 7 through a outout recess 7b in the housing 7.

When the motor actuator 1 is assembled with the switching unit 2, the switching unit 2 is disposed closely to the bottom of the motor actuator 1, with the attachment lugs 13 disposed in vertical alignment with the corresponding retainer recesses 14. Then, the motor actuator 1 is depressed toward the switching unit 2. During that time, the D-shaped lower end portion of the output shaft 4 is inserted into the D-shaped engagement hole 19 of the contact mount base 9 of the switching unit 2. At the same time, the retainer recesses 14 and the attachment lugs 13 are brought together until the locking projections 16 are snapped with the corresponding locking holes 15. Thus, the motor actuator 1 and the switching unit 2 are assembled together.

The motor actuator 1 and the switching unit 2 will be further described with respect to their circuit constructions.

Figure 7:
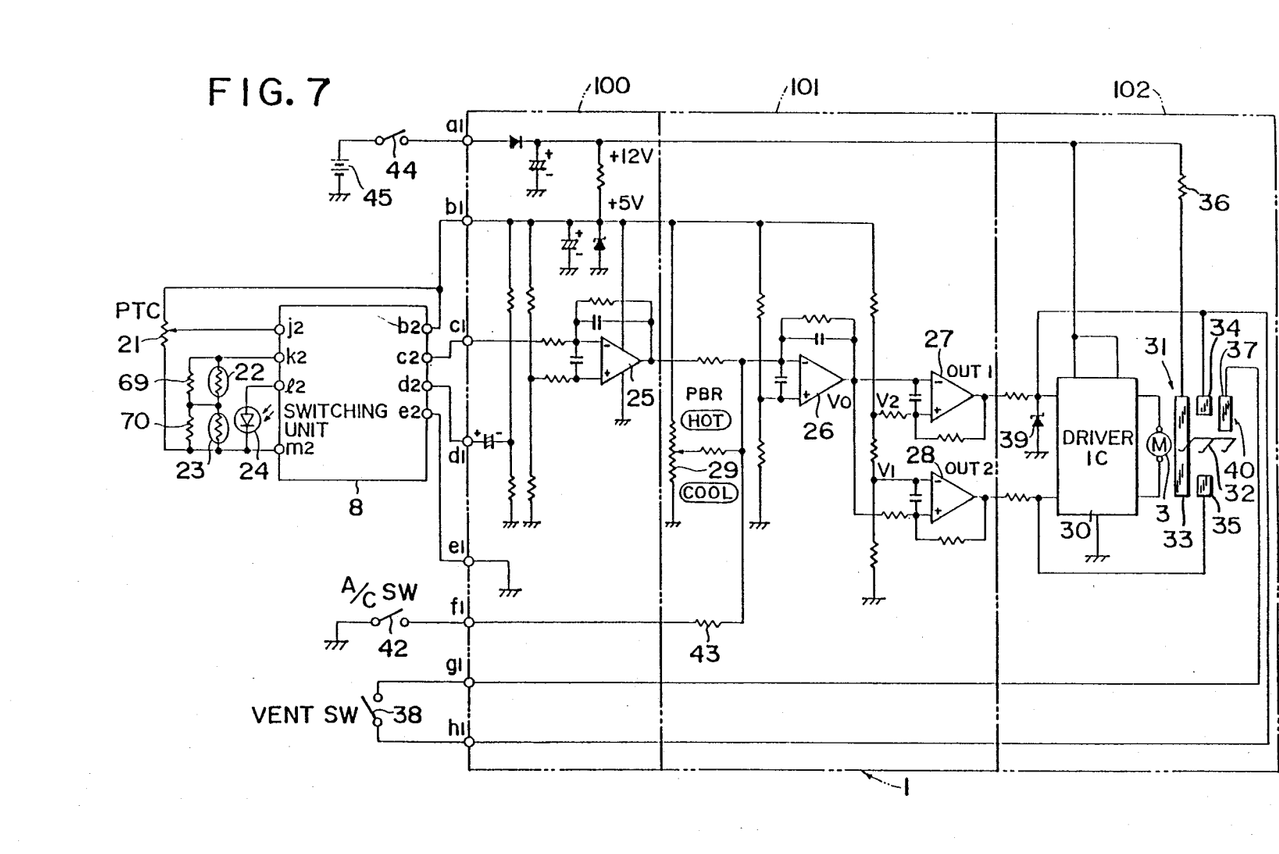
FIG. 7 is a circuit diagram of an electric circuit incorporated in the motor actuator.

FIG. 7 shows an electric circuit incorporated in the motor actuator 1. The electric circuit includes a total signal calculation circuit 100, a comparator circuit 101 and a driver circuit 102. The total signal calculation circuit 100 is so constructed as to calculate a signal corresponding to the current thermal load in a vehicle compartment, based on the output signals from a temperature setter 21, a vehicle compartment temperature sensor 22, an outside air temperature sensor 23 and a sunlit portion temperature sensor 24. To this end, the total signal calculation circuit 100 includes a differential amplifier circuit generally comprising an operational amplifier 25. The operational amplifier 25 has an output terminal on which a so-called signal is outputted. The total signal corresponds to a thermal load indicated by the following equation.

$$T = (Tr - 25) + K1(Ts - 25) + K2(Ta - 25) - K4(Td - 25)$$

where Tr is the vehicle compartment temperature, Ts is the amount of incident light of the sun, Ta is the outside air temperature, Td is the setting temperature obtained by the temperature setter 21, and K1–K4 are constants.

The comparator circuit 101 operates to supply the drive circuit 102 with a drive signal depending on the magnitude of the output signal of the total signal calculation circuit 100. The comparator circuit 101 generally comprises three operational amplifiers 26, 27, 28.

The operational amplifier 26 has two inverting input terminals receiving the output signal from the total signal calculation circuit 100 and the output signal from a potentiometer 29 detecting the opening of the air-mix door 87, respectively. These output signals are added by the operational amplifier 26 and an added inverting output signal appears on the output terminal of the operational amplifier 26.

The output signal from the operational amplifier 26 is inputted to a window comparator circuit composed mainly by the operational amplifiers 27, 28. The operational amplifiers 27, 28 output at their output terminal a high "H" or a low "L" output signal whose magnitude varies depending on the magnitude of the output signal of the operational amplifier 26.

Stated more specifically, the output characteristics of the comparator circuit 101 are summarized as tabulated in the following Table 1, wherein V0 is the magnitude of an output signal from the operational amplifier 26, V1 is a reference voltage applied to an inverting input terminal of the operational amplifier 28, V2 is a reference voltage applied to a non-inverting input terminal of the operational amplifier 27, OUT1 is an output signal from the operational amplifier 27, and OUT2 is an output signal from the operational amplifier 28.

TABLE 1

| INPUT V0 | OUTPUT | OUT1 | OUT2 |
|---|---|---|---|
| V0 < V1 | | H | L |
| V1 < V0 < V2 | | H | H |
| V2 < V0 | | L | H |

The driver circuit 102 drives the actuator motor 3 in the forward direction or the reverse direction depending on the output signal from the comparator circuit 101. The driver circuit 102 generally comprises a driver IC (integrated circuit) 30.

The driver IC 30 is constructed by integrating a per se known transistor driver circuit for motors of the type concerned and commercially available.

In the illustrated embodiment, when OUT1="H" and OUT2="L", the driver IC 30 energizes the actuator motor 3 to move or turn the air-mix door 87 toward the full-cool side (that position indicated by II in FIG. 1). Likewise, when OUT1="L" and OUT2="H", the driver IC 30 energizes the actuator motor 3 to turn the air-mix door 87 toward the full-heat side (that position indicated by I in FIG. 1). When both OUT1 and OUT2 are "H" or "L", the driver IC 30 terminates energizing of the actuator motor 3.

Designated by 31 is a stop switch for forcibly stopping the operation of the actuator motor 3 achieved by the driver IC 30. The stop switch 31 is formed on a printed wiring board so as to extend arcuately about the output shaft 4 which is connected to the actuator motor 3 via a reduction gear (not shown).

The stop switch 31 includes a movable contact 32, a common electrode 33, a first fixed electrode 34 and a second fixed electrode 35. The movable contact 32 is connected either directly, or indirectly through another component, to the output shaft 4 of the motor actuator 1 for co-rotation with the actuator motor 3.

The common electrode 33 extends arcuately about the output shaft 4 and is longer than the extent of angular movement of the output shaft 4. The movable contact 32 is held in sliding contact with the common electrode 33. The common electrode 33 is connected with a power supply 45 via a resistance 36 so that a supply voltage of +12 V is supplied to the common electrode 33.

The first fixed electrode 34 is disposed parallel to one end of the common electrode 33, while the second fixed electrode 35 is disposed parallel to the opposite end of the common electrode 33 in the same manner as the first fixed electrode 34.

The respective positions of the first and second fixed electrodes 34, 35 correspond respectively to the full-heat position and the full-cool position of the air-mix door 87. The first and second fixed electrodes 34, 35 are selectively brought into contact with the common electrode 33 via the movable contact 32 as the movable contact 32 is moved.

The first fixed electrode 34 is connected with one of two input terminals of the driver IC 30 to which the output signal is inputted from the operation amplifier 27. The first fixed electrode 34 is also connected to an external terminal h1.

The second fixed electrode 35 is connected to the other input terminal of the driver IC 30.

A third fixed electrode 37 is disposed parallel to the one end of the common electrode 33 in the same manner as the first fixed electrode 34 and is adapted to be connected with the common electrode 33 via the movable contact 32.

The position of the third fixed electrode 37 is determined to correspond to a limit opening at which the opening of the air-mix door 87 is limited in the vent mode. To this end, the third fixed electrode 37 is longer than the first fixed contact 34. The third fixed electrode 37 is connected to an external terminal g1. A vent switch 38 disposed outside the motor actuator 1 is connected with the external terminals g1 and h1. The vent switch is closed when the vent mode is selected by a set switch, not shown, of the air-conditioner.

Accordingly, while the vent switch 38 is kept closed, the movable contact 32 is brought into contact with the third fixed electrode 37, whereupon the first fixed electrode 34 is connected with the supply voltage +12 V via the vent switch 38, the third fixed electrode 37, movable contact 32 and the common electrode 33. In this instance, however, since the input terminal to which the first fixed electrode 34 is connected is connected with a Zener diode 39, the potential of this input terminal is kept at a predetermined Zener voltage.

Thus, the movable contact 32, the common electrode 33 and the third fixed electrode 37 jointly constitute a limit switch 40.

External terminals b1, c1, d1 and e1 of the motor actuator 1 are connected with the temperature setter 21, the vehicle compartment temperature sensor 22, the outside air temperature sensor 23 and the sunlit portion temperature sensor 24 via a gain adjustment resistance circuit 41 formed on the circuit board 8 of the switching unit 2. The external terminal c1 is supplied with a voltage which corresponds to a total thermal load indicated by the sum of the setting temperature, vehicle compartment temperature, external air temperature and the incident light of the sun.

Designated by 42 is an air-conditioner switch for starting and stopping a compressor (not shown) of the automobile air-conditioner. This switch 42 is closed when the compressor is started. One end of the switch 42 is grounded, the other end being connected to an external terminal f1. The external terminal f1 is connected to the inverting input terminal of the operational amplifier 26 via a resistance 43. Accordingly, when the air-conditioner switch 42 is closed, the output voltage V0 from the operational amplifier 26 is equal to a predetermined voltage Vx (Vx>V2). Consequently, the operational amplifier 27 produces an "L" signal and the operational amplifier 28 produces a "H" signal. The movable contact 32 is moved by the actuator motor 3 in a direction toward the first fixed electrode 34. In this instance, the opening detection potentiometer 29 is caused, so that the movable contact 32 can be stopped at any appropriate position in front of the third fixed contact 37 by selecting the value of the resistance 43 at a desired value.

The foregoing operation taken on the closing of the air-conditioner switch 42 is to move the air-mix door 87 toward the full heat side to thereby compensate a reduction of the discharge air temperature which would otherwise occur when the compressor is started. The discharge air temperature is thus maintained at a value nearly equal to the temperature provided before the air-conditioner switch is turned on. Consequently, a deterioration of the air-conditioning feeling can be avoided.

External terminal a1 is connected to the power supply 45 through a power switch 44.

The electric circuit of the foregoing construction operates as follows. When the power switch 44 is turned on, the predetermined supply voltage is supplied to the motor actuator and the switching unit 2 to thereby energize the entire apparatus.

When an air-conditioning mode other than the vent mode is selected and when the vehicle compartment temperature exceeds the setting temperature in spite of the fact that the temperature setter 21 is set to the cool side (the air-conditioner switch 42 is kept open), the total signal calculation circuit 100 produces a positive output voltage which in turn is supplied to the inverting input terminal of the operational amplifier 26 of the comparator circuit 101 together with a voltage from the opening detection potentiometer 29.

Since the voltage at the inverting input terminal of the operational amplifier 26 is larger than the reference voltage appearing at the non-inverting input terminal of the same amplifier 26, the output voltage at the operational amplifier 26 is lower than V1. The output signal from the comparator circuit 101 are therefore OUT1="H" and OUT2="L".

Consequently, the actuator motor 3 is driven by the driver IC 30 to turn the air-mix door 87 toward the full-cool side. Simultaneously with the activation of the actuator motor 3, the movable contact 32 is moved downwards in FIG. 7, namely toward the second fixed electrode 35 while contacting the common electrode 33.

In response to movement of the air-mix door 87, the vehicle compartment temperature is gradually lowered. In this instance, when the vehicle compartment temperature becomes equal to the setting temperature before the movable contact 32 arrives at the second fixed electrode 35, V1<V0<V2. Consequently, the actuator motor 3 is stopped.

When the vehicle compartment temperature does not reach the setting temperature, the actuator motor 3 continues its operation to further advance the movable contact 32 toward the second fixed electrode 35. The continuous operation of the actuator motor 3 causes the movable contact 32 to contact the second fixed electrode 35 whereupon the second fixed electrode 35 is electrically connected with the common electrode 33 via the movable contact 32. Consequently, the input terminal of the driver IC 30 to which the output terminal of the operational amplifier 27 is connected is supplied with a Zener voltage from the Zener diode 39. Both input terminals of the driver IC 30 therefore have the "H" signal stage. The driver IC 30 terminates the supply of power to the actuator motor 3 so that the actuator motor 3 stops operation and the air-mix door 87 is set in the full-cool position.

Thereafter, once the temperature setter 21 is actuated to rise the setting temperature for increase the vehicle compartment temperature, the output voltage V0 from the operational amplifier 26 of the comparator circuit 101 changes to V0>V2 so that the output signals from the comparator circuit 101 become OUT1="L" and OUT2="H". Consequently, the actuator motor 3 is energized by the driver IC 30 to rotate in a direction opposite to the direction of the foregoing operation to thereby move the movable contact 32 toward the first fixed electrode 34.

Now, if the vent switch 33 is not closed, namely the discharge mode is set to a mode other than the vent mode, then the movable contact 32 does not produce any action upon contact with the third fixed electrode 37 and is allowed to continue its movement so long as the output signals from the comparator circuit 101 are OUT1="L" and the OUT2="H". The movable contact 32 is brought into contact with the first fixed electrode 34 whereupon both input terminal of the driver IC 30 become the "H" signal stage in the same manner as described with respect to the movement toward the full-cool side. Thus, the actuator motor 3 is stopped and the air-mix door 87 is set to its full-heat position.

In case where the vent mode is selected, the vent switch 38 is closed. When the movable contact 32 engages the third fixed electrode 37, the first fixed electrode 34 is brought into conduction with the common electrode 33 through the vent switch 38, the third fixed electrode 37 and the movable contact 32. This conducted state is equivalent to a conducted state which is obtained when the movable contact 32 directly engages the first fixed electrode 34. Consequently, the actuator motor 3 is stopped and the air-mix door 87 is confined or limited in its opening to a position ahead of the full-heat position.

This air-mix door opening limiting position can be varied by changing the position of the third fixed electrode 37.

For instance, assuming that FIG. 7 shows a 70% opening state (stated otherwise a 30% limited opening state), a greater opening restriction can be obtained by elongating the third fixed electrode 37 toward the second fixed electrode 35 to thereby enable the air-mix door 87 to stop at a position far ahead of the full-heat position.

When the air conditioner switch 42 is closed, the air-mix door 87 is moved toward the full-heat side by a predetermined angular distance so as to prevent an undue temperature drop as described above. The above-mentioned operation is achieved without change even when the air-conditioner switch 42 is closed.

A description will be given to the structure of a speed regulating variable resistor 46 and a mode selection switch 47 provided on the circuit board 8 of the switching unit 2 with reference to FIG. 6.

The speed regulating variable resistor 46 is used for regulating the speed of a fan motor 48 and includes in addition to the movable contact 17, a common electrode 49, a first terminal electrode 50, a second terminal electrode 51, a short-circuit electrode 53 and a resistance pattern 54 that are formed by printed wiring on the circuit board 8 and arranged arcuately around the through-hole 8a at one side thereof. The variable resistor 48 is generally the same in structure as the known devices of the type concerned except that the short-circuit electrode 53 is disposed at a central portion of the resistance pattern 54. Accordingly, when the movable contact 17 engages the short-circuit electrode 53, the short-circuit electrode 53 is brought in conduction with the common electrode 49 via the movable contact 17. In this instance, the output resistance from the speed regulating variable resistor 46 is zero.

The mode selection switch 47 includes in addition to the movable contact 18 stated above, a common electrode 55, first to third fixed electrode 56–58, and first and second short-circuit electrode 59, 60 that are disposed on the circuit board 8. These electrodes 55–60 formed by printed wiring on the circuit board 8 in the same manner as the electrodes of the speed regulating variable resistor 48 and arranged arcuately around the through-hole 8a at the opposite side thereof.

The speed regulating variable resistor 46 and the mode selection switch 47 are incorporated in an electronic circuit formed in the circuit board 8. The electronic circuit will be described below with reference to FIG. 8.

Figure 8:
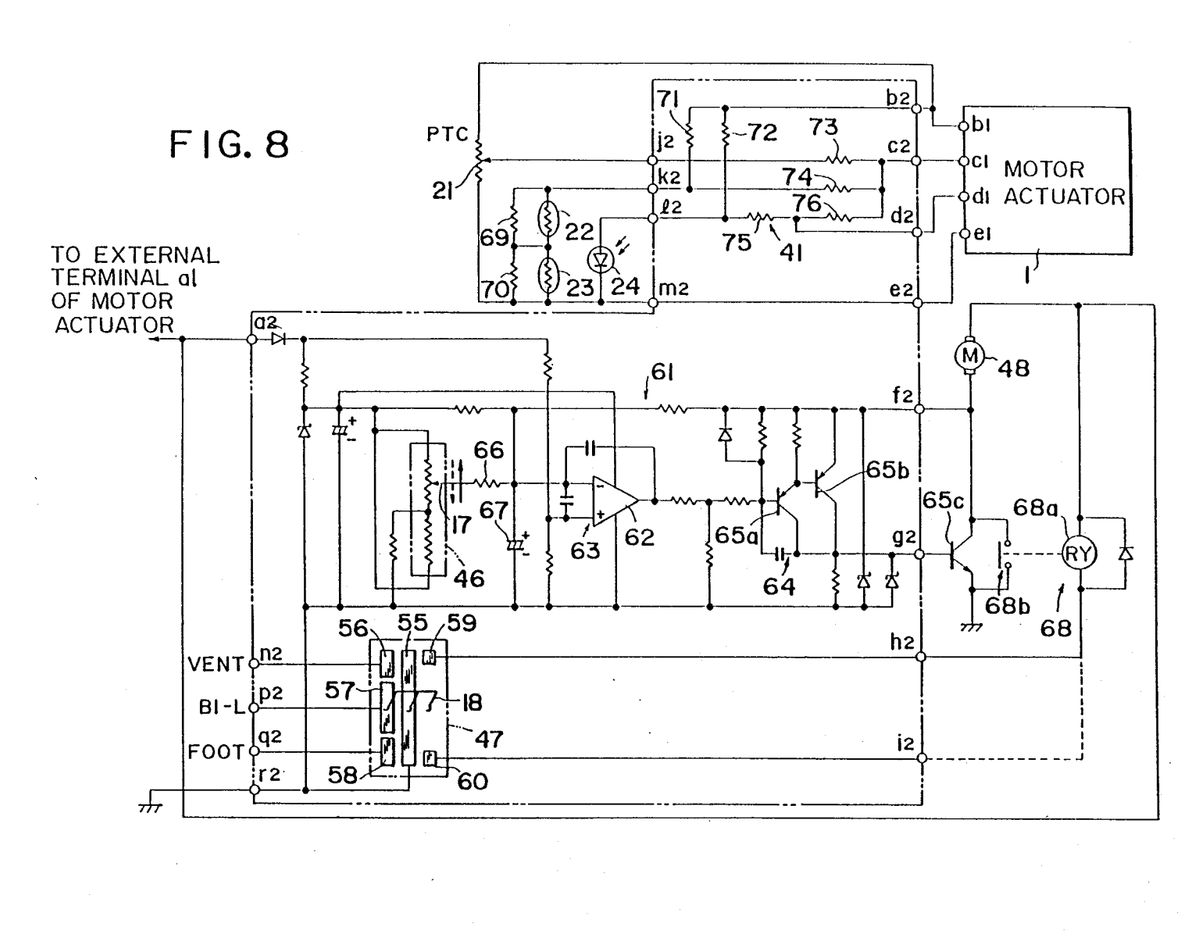
FIG. 8 is a circuit diagram of an electric circuit incorporated in the switching unit.

The electronic circuit includes a fan motor control portion 61 which is composed of a comparator circuit 63 comprising an operational amplifier 62, and a driver circuit 64 comprising a power transistors 64a, 65b. The fan motor control portion 61 functions to vary the emitter-terminal current of the power transistor 65b with the output resistance of the speed regulating variable resistor 46.

The output terminal of the speed regulating variable resistor 46, namely the movable contact 17 is connected to an inverting input terminal of the operational amplifier 62 via a resistance 66. The inverting input terminal is grounded through an electrolytic capacitor 67 so that when the power is applied, the signal rise time at the inverting input terminal is slowed down to thereby prevent the fan motor 48 from starting at a high rotational speed.

The emitter terminal of the power transistor 65b is connected through an external terminal f2 with one end of the fan motor 48 and also with the collector terminal of a power transistor 65c. The collector terminal of the power transistor 65b is connected through an external terminal g2 to the base terminal of the power transistor 65c whole emitter terminal is grounded.

The other end of the fan motor 48 is connected to the external terminal a1 of the motor actuator 1 (or to one end of the power switch 44) for being connected with the power supply 45 through the power switch 44. To the other end of the fan motor 48, one end of an exciting coil 68a of a relay 68 is connected, the other end of the exciting coil 68a being connected to an external terminal h2. In case of necessity, the other end of the fan motor 48 may be connected with an external terminal i2. The relay 68 has a normally open contact 68b connected between the collector terminal and the emitter terminal of the power transistor 65c.

The first to third fixed electrodes 56–58 of the mode selection switch 47 are connected with external terminals n2, p2 and q2, respectively. The common electrode 55 is ground level via an external terminal r2.

The first and second short-circuit electrodes 59 and 60 are connected respectively to the external terminals h2 and i2.

The gain adjustment resistance circuit 41 includes two resistances 71 and 72 having one ends connected in common to an external terminal b2 to which a supply voltage +5 V is applied via the external terminal b1 of the motor actuator 1. The other end of the resistance 71 is connected to an external terminal k2 while the other end of the resistance 72 is connected to an external terminal 12.

An external terminal j2 is connected to an external terminal c2 via a resistance 73. The external terminals k2 and 12 are connected to the external terminals c2 respectively through a resistance 74 and two series-connected resistances 75, 76.

The junction between the two resistances 75, 76 is connected to an external terminal d2.

The electronic circuit of the foregoing construction operates as follows. When the motor actuator 1 is driven, the contact mount base 9 is turned simultaneously. With this angular movement of the contact mount base 9, the output resistance from the speed regulating variable resistor 46 is caused to vary whereupon depending on the preset characteristics of the speed regulating variable resistor 46, the rotational speed of fan motor 48 is caused to vary with the opening of the air-mix door 87, as indicated by the performance curve (b) shown in FIG. 9.

Figure 9:
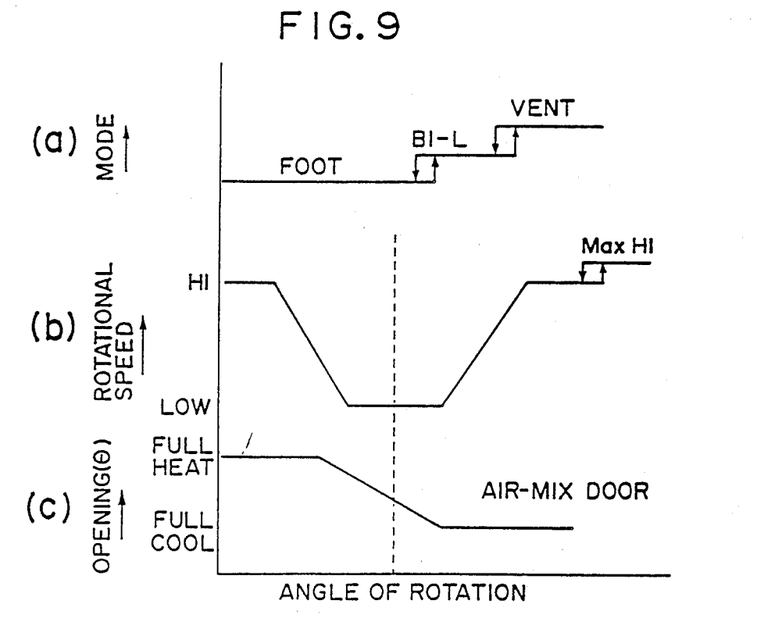
FIG. 9 is a graph showing performance curves of the mode selection timing, the rotational speed of a fan, and the air-mix door opening taken with respect to the angle of rotation of an output shaft.

In the course of the vent mode, the first short-circuit electrode 59 is grounded through the movable contact 18 and the common electrode 55 whereupon the power transistor 65c is short-circuited by the relay 68 to thereby increase the rotational speed of the fan motor 48 to a maximum value (MAX HI), as shown in FIG. 9.

In this instance, a certain hysteresis is produced between a first position where the rotational speed of the fan motor 48 reaches to MAX HI and a second position where the rotational speed of the fan motor 48 departs from MAX HI. This hysteresis is caused by the backlash produced between the output shaft 4 and the contact mount base 9 when the output shaft 4 is driven. The amount of hysteresis is equal to an angle $\theta$ shown in FIG. 5(b).

In the foot mode, the same operation can be obtained if the external terminal i2 is connected to one end of the relay 68 as indicated by dotted line shown in FIG. 8.

On-off signals outputted respectively across the external terminals r2 and n2, the external terminals r2 and p2 and the external terminals r2 and q2 are fed into a non-illustrated mode door changeover device for selecting any appropriate mode door. The mode selection characteristic taken with respect to the angle of rotation of the movable contact 18 is indicated by the performance curve (a) shown in FIG. 9. The performance curve involves hysteresis produced each time the operation mode is changed. This is due to the same reason as described with respect to the hysteresis in the rotational speed of the fan motor 48.

According the foregoing embodiment, the vehicle compartment sensor 22 is connected in parallel with a resistance 69 at the outside of the electronic circuit. Likewise, the outside air temperature sensor 23 is connected in parallel with a resistance 70 at the outside of the electronic circuit. These resistances 69, 70 may be provided in the switching unit 2.

A modified electric circuit for the motor actuator 1 will be described with reference to FIG. 10. These parts which are corresponding or identical to those described with the first embodiment shown in FIG. 7 are designated like or corresponding reference characters. Because of the structural similarity, a description is given only to those part different to the first embodiment.

Figure 10:
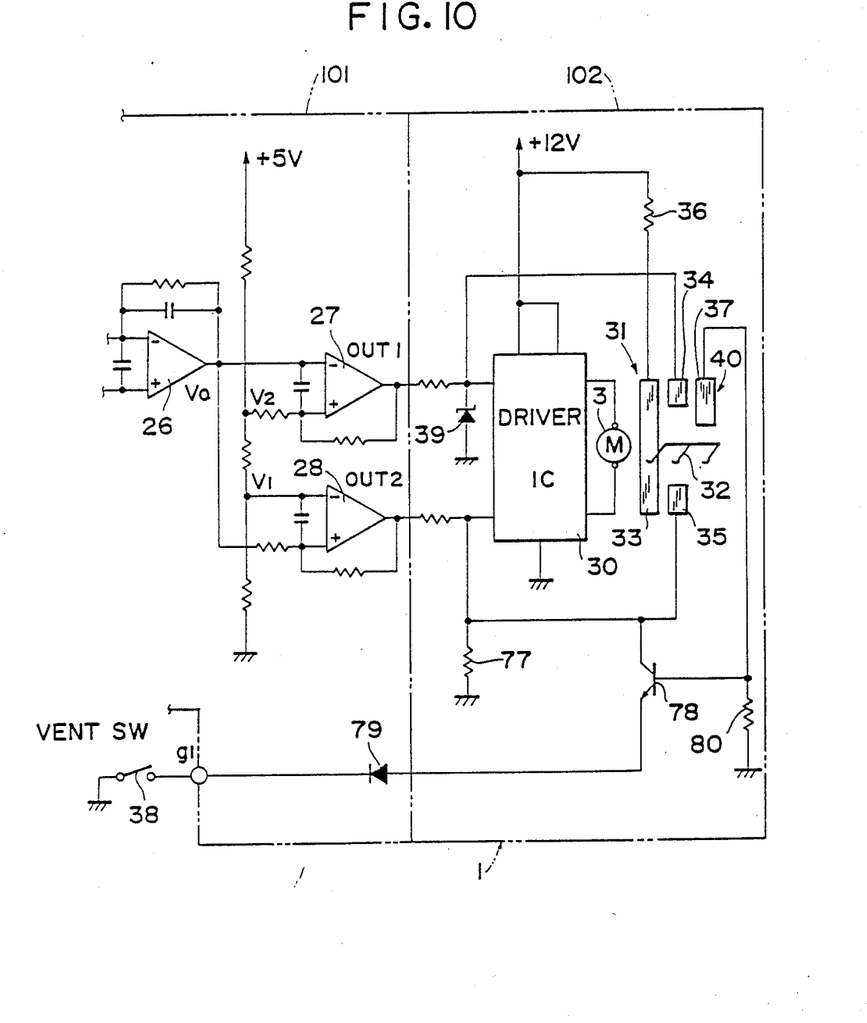
FIG. 10 is a circuit diagram showing a part of an electric circuit of the motor actuator according to another embodiment of the present invention.

As shown in FIG. 10, the second fixed electrode 35 is connected to one input terminal of the driver IC 30 which in turn is grounded via a resistance 77. The second fixed electrode 35 is connected to the collector terminal of a transistor 78. The emitter terminal of this transistor 78 is connected via a diode 79 to an external terminal g1 which in turn is grounded via the vent switch 38.

The base terminal of the transistor 78 is grounded via a resistance 80 and it is also connected to the third fixed electrode 37.

With this construction, with the vent switch 38 kept in closed state, the movable contact 32 is brought into sliding contact with the third fixed electrode 37 whereupon the base terminal of the transistor 78 is supplied with a predetermined voltage which is determined by the rate of division of the resistance 36 to the resistance 80 (however, is lower than the voltage of "H" signal appearing at the input terminal of the driver IC 30). The transistor 78 is thus conducting. Since the other input terminal of the driver IC 30 is the "L" signal state, the actuator motor 3 is de-energized.

When the vent switch 38 is kept opened, the emitter terminal of the transistor 78 is not grounded. With this condition, the transistor 78 is not turned on even when the movable contact 32 engages the third fixed electrode 37. Consequently, the state of the driver IC 30 is not influenced.

An electric circuit for the motor actuator 1 according to a third embodiment of the present invention will be described with reference to FIG. 11. These parts which are corresponding or identical to those described with respect to the first embodiment shown in FIG. 7 are designated by identical or corresponding reference characters. With the structural similarity in view, a description is given to different features.

Figure 11:
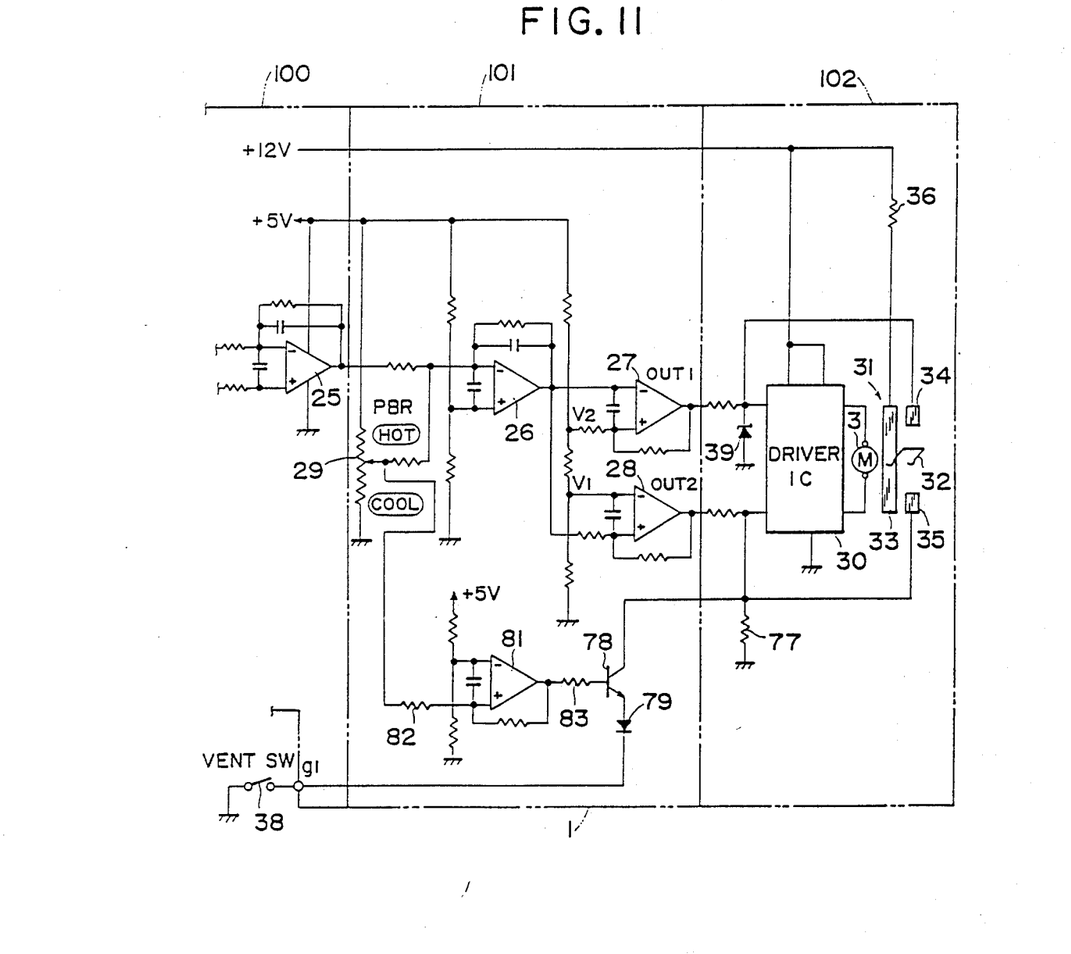
FIG. 11 is a circuit diagram similar to FIG. 10, but showing an electric circuit according to still another embodiment of the present invention.

As shown in FIG. 11, a comparator circuit 101 includes a differential amplifier circuit of the non-inverting type composed mainly of an operational amplifier 81. The operational amplifier 81 has a non-inverting input terminal connected with a slider of the opening detection potentiometer 29 via a resistance 82.

The output terminal of the operational amplifier 81 is connected to the base terminal of a transistor 78. The collector terminal of this transistor 78 is connected with one input terminal of the driver IC 30 together with the second fixed electrode 35. This input terminal is grounded via a resistance 77.

The emitter terminal of the transistor 78 is connected to the external terminal g1 via a diode 79.

With this construction, as the air-mix door 97 is moved toward the full-heat side with the vent switch 38 kept in the closed state, the input voltage appearing at the non-inverting input terminal of the operational amplifier 81 gradually increases with the movement of the air-mix door 87. When the input voltage exceeds the reference voltage on the inverting input terminal, then the base terminal of the transistor 78 is supplied with a positive voltage. Thus the transistor 78 is conducting.

In this instance, since, the other input terminal of the driver IC 30 to which the second fixed electrode 35 is connected is the "L" signal state, the actuator motor 3 is not energized.

As obvious from the foregoing description, the reference voltage applied to the inverting input terminal of the operational amplifier 81 is to determine the position at which the angular position or the opening of the air-mix door 87 is limited. The amount of limitation of the air-mix door opening decreases with an increase in amount of the reference voltage. Stated otherwise, the opening limiting position progressively approaches the full-heat position of the air-mix door 87 as the reference voltage is increased.

When the vent switch 38 is kept open, the transistor 78 is kept in the non-conducting state regardless of the base-terminal voltage. Accordingly, the transistor 78 is nothing to do with the operation of the stop switch 31. The stop switch 31 effectively stops the operation of the actuator motor 3 at the full-heat and full-cool positions.

Obviously, various modifications and variations of the present invention are possible in the light of the above teaching. It is therefore to be understood that within the scope of the appended claims the present invention may be practiced otherwise than as specifically described.

What is claimed is:

1. A motor actuator for an air-mix door of an automobile air-conditioner, comprising:
    (a) a motor for driving the air-mix door;
    (b) a driver circuit for said motor, said driver circuit being operative to energize said motor based on the combination of two input signals and also to de-energize said motor when said two input signals are identical to one another;
    (c) a stop switch for supplying a stop signal to said driver circuit for causing said driver circuit to stop energizing said motor, said stop switch including
        (c-i) a movable contact adapted to be turned through a predetermined angular distance simultaneously with operation of said motor,
        (c-ii) a first fixed electrode disposed at one end of said predetermined angular distance and engageable with with said movable contact, and
        (c-iii) a second fixed electrode disposed at the other end of said predetermined angular distance and engageable with said movable contact; and
    (d) a limit switch for limiting angular movement of said movable contact toward one of said first and second fixed electrodes as said movable contact is moved by said motor, said limit switch including
        (d-i) said movable contact and
        (d-ii) a third fixed electrode, said third fixed electrode being disposed on a first arc extending in an arcuate path of movement of said movable contact, said first arc being different from a second arc on which said first and second fixed electrodes are disposed, said third fixed electrode being connected with said one of the first and second fixed electrodes via a vent switch adapted to be closed when the air-conditioner is operating in a vent mode,
        (d-iii) said limit switch, when said movable contact engages said third fixed electrode, being operative to cause the combination of said input signals of said driver circuit to be set in a condition to stop energizing of said motor.

2. A motor actuator according to claim 1, wherein said limit switch is responsive to engagement between said movable contact and said third fixed electrode occurring during the vent mode to equalize the potential of said one of the first and second fixed electrodes and the potential of the other fixed electrode, thereby limiting rotation of said motor toward said other fixed electrode.

3. A motor actuator for an air-mix door of an automobile air-conditioner, comprising:
    (a) a motor for driving the air-mix door;
    (b) a driver circuit for said motor, said driver circuit being operative to energize said motor based on the combination of two input signals and also to de-energize said motor when said two input signals are identical to one another;
    (c) a stop switch for supplying a stop signal to said driver circuit for causing said driver circuit to stop energizing said motor, said stop switch including
        (c-i) a movable contact adapted to be turned through a predetermined angular distance simultaneously with operation of said motor,
        (c-ii) a first fixed electrode disposed at one end of said predetermined angular distance and engageable with. with said movable contact, and
        (c-iii) a second fixed electrode disposed at the other end of said predetermined angular distance and engageable with said movable contact;
    (d) a position sensor for detecting the position of said movable contact; and
    (e) a comparator circuit for detecting a predetermined output signal from said position sensor while the air-conditioner is operating in a vent mode and equalizing the potential of one of said first and second fixed electrodes and the potential of the other fixed electrode to thereby limiting rotation of said motor toward said other fixed electrode.

4. A combined motor-actuator and switching-unit assembly for an air-mix door for an automobile air-conditioner, comprising:
(a) a motor actuator including
 (a-i) a first housing,
 (a-ii) a motor disposed in said first housing for driving the air-mix door, and
 (a-iii) an electric circuit disposed in said first housing for controlling operation of said motor based on at least a vehicle compartment temperature and a setting temperature;
(b) a switching unit including
 (b-i) a second housing, and
 (b-ii) a switch mechanism disposed in said second housing for producing control signals for controlling various components of the automobile air-conditioner except the air-mix door, said switch mechanism including a rotating member interconnected with an output shaft of said motor actuator for co-rotation therewith, a movable contact disposed on said rotating member, and a plurality of fixed electrodes engageable with said movable contact;
(c) at least one locking lug disposed on one of said first and second housings, and at least one retaining recess provided in the other housing and locking receptive of said locking lug; and
(d) means defining an engagement hole in one of said output shaft and said rotating member for receiving the other of said output shaft and said rotating member, whereby said first and second housings are assembled together through interlocking engagement between said locking lug and said retainer recess, and said rotating member is movable together with said output shaft of said motor actuator.

5. A combined motor-actuator and switching-unit assembly according to claim 4, wherein said output shaft has an end portion of a first generally D-shaped cross-sectional shape defined jointly by a straight portion and an arcuate portion, said engagement hole being defined in said rotating member and having a second generally D-shaped cross sectional shape defined jointly by a straight portion and an arcuate portion, said arcuate portion of said second D-shaped cross-sectional shape being longer than the arcuate portion of said first D-shaped cross-sectional shape.

* * * * *